United States Patent

[11] 3,604,930

| [72] | Inventor | Philips J. Allen<br>Washington, D.C. |
|---|---|---|
| [21] | Appl. No. | 16,887 |
| [22] | Filed | Mar. 5, 1970 |
| [45] | Patented | Sept. 14, 1971 |
| [73] | Assignee | The United States of America as represented by the Secretary of the Navy |

[54] METHOD AND APPARATUS FOR DISPLAYING VISUAL IMAGES OF INFRARED BEAMS
3 Claims, 7 Drawing Figs.

[52] U.S. Cl.................................................. 250/83 R,
    250/83.3 HP
[51] Int. Cl..................................................... G01n 21/00
[50] Field of Search........................................... 250/83 R,
    83.3 HP; 23/230 LC

[56] References Cited
UNITED STATES PATENTS

| 3,114,836 | 12/1963 | Fergason et al............... | 250/83 R |
| 3,401,262 | 9/1968 | Fergason et al............... | 250/83.3 HP X |
| 3,524,726 | 8/1970 | DeKoster..................... | 23/230 LC |
| 3,529,156 | 9/1970 | Fergason et al............... | 250/83 R |

Primary Examiner—Archie R. Borchelt
Attorneys—R. S. Sciascia, Arthur L. Branning and James G. Murray ABSTRACT: A method and device for displaying a visual pattern of an incident beam of infrared radiation includes a film of minute droplets of a liquid crystal composition encapsulated in gelatin. The nature of the composition is such that within a certain temperature range its optical properties change with a change of temperature so that it appears to change color. The film of liquid crystal is thermally biased to its critical temperature so that when incident infrared radiation is absorbed by the composition, the temperature thereof is raised which causes a color change in the zone of the film on which the radiation is incident.

INVENTOR

PHILIP J. ALLEN

BY

ATTORNEY

INVENTOR

PHILIP J. ALLEN

BY

ATTORNEY

METHOD AND APPARATUS FOR DISPLAYING VISUAL IMAGES OF INFRARED BEAMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to optical sensors, and more particularly to devices for displaying a visual pattern corresponding to a beam of infrared radiation.

The adjustment and alignment of lasers and optical systems using light in the visible region often is accomplished simply by observing an image while making experimental changes. The task becomes notably more difficult in the infrared region, where one must rely on some intermediate mechanism for converting the invisible infrared radiation to a visible image. The problem is particularly acute for users of long wavelength lasers such as the $CO_2$ laser at 10.6 microns where one often resorts to "images" burned in paper or wood, or a glowing spot on a firebrick. Quantitative measurements can be made with a calibrated thermopile, but this method reveals little or nothing about the shape size, and mode structure of the beam.

Laser imaging techniques in the near infrared include conventional infrared-sensitive films, electronic image converters, infrared-sensitive Vidicons, and infrared phosphor screens. However, none of these has useful sensitivity beyond about 2 microns.

At longer wavelengths, most techniques for imaging lasers rely on thermal effects. These include incandescent imaging, heat-quenched phosphors, thermally sensitive films and papers, and liquid crystal screens. Each of these methods has certain undesirable limitations. For example, incandescent imaging is feasible only when appreciable power is available. Heat-quenched phosphors require continuous ultraviolet activation, produce a negative image, and must be viewed in near darkness. The various heat-sensitive film and paper techniques can be used to record thermal images, but are not useful for real-time viewing.

Liquid crystal screen offer a number of attractive advantages for infrared laser imaging, such as high thermal sensitivity and real-time viewing in bright light, but normal exposure to the atmosphere and ultraviolet light often results in total loss of sensitivity, sometimes in a matter of hours. There have been attempts in the past to isolate the liquid crystal from exposure to the atmosphere and ultraviolet light by placing the sensitive screen in an evacuated chamber provided with viewing and signal windows, but the cost and complexity of such a device severely limits its utility, and the technique has not found wide acceptance.

The need has thus long existed for a low cost, rugged, chemically stable, sensitive, and easily used imaging device that displays in real time a positive image, visible in ordinary light, of the size, shape and mode structure of a beam of infrared radiation.

SUMMARY OF THE INVENTION

Accordingly, an object of this invention is to provide an infrared-radiation-imaging device that produces a distinct visible image of an infrared beam and is viewable in real time.

Another object of this invention is to provide an infrared imaging device that is convenient and easy to use and which is relatively immune to the deleterious effects of exposure to the atmosphere and ultraviolet light.

A further object of this invention is to provide a class of infrared-imaging devices which are inexpensive to manufacture and which may be easily designed to satisfy the particular requirements of the user as to screen sensitivity, time constant, and image resolution.

Yet another object of this invention is to provide a method of forming a visual image of a beam of invisible infrared radiation that is convenient and inexpensive to use and produces a real-time image visible in ordinary light.

These and other objects have been attained by providing a film of encapsulated liquid crystal composition disposed in a screen on which the infrared beam is incident. The temperature of the screen is biased to the critical temperature of the liquid crystal and the energy absorbed by the screen in the zone on which the beam is incident causes a light rise in temperature and a corresponding change in color, thus causing a visible image coinciding with the size, shape, and mode structure of the beam cross section.

DESCRIPTION OF THE DRAWING

A more complete appreciation of the invention and its many attendant advantages will develop as the same becomes better understood by reference to the following detailed description when considered in connection with the accompanying drawings, wherein.

DESCRIPTION OF THE PREFERRED EMBODIMENT

Liquid crystals are substances that share some of the properties of both liquid and crystal states—the so-called mesomorphic state—and as a consequence exhibit some unusual optical properties. Of particular interest here is the observable change of color with temperature which is a very sensitive function in some liquid crystals.

Of the three general classes of liquid crystals, smectic, nematic, and cholesteric, it is the cholesteric phase which is of most interest in this application. The molecules of a cholesteric substance are disposed in layers, each layer being formed of parallel rows of axially aligned molecules. From layer to layer there is an angular progression of the orientation of the molecular axis within each layer, resulting in a helical arrangement. It is this periodic, helical arrangement of molecules which is responsible for the color-sensitive scattering observed with liquid crystals. The change in color of the scattered light with change in temperature of the liquid crystal is due to a slight change in the angular displacement between the molecules of adjacent layer, i.e., to a change in the pitch of the helical arrangement. This observable color change is liquid crystals makes a very sensitive visual indicator of temperature.

Liquid crystals often are sensitive to other influences including electric and magnetic fields, mechanical stress, ultraviolet radiation, and various vapors. It is the latter two sensitivities which are responsible for deterioration in the thermooptical sensitivity of exposed liquid crystals. This problem has restricted their measurement application mainly to short term use with freshly coated surfaces.

In initial efforts to develop an imaging detector for infrared laser beams, a fluid liquid crystal composition was applied to a thin Mylar sheet coated on the reverse side with flat black lacquer which provided the necessary dark background and also functioned to absorb the infrared radiation. Using thermal bias provided by visible and infrared incandescent lamps, some success was achieved in detecting a fraction of a kilowatt laser beam at 1.15 microns. However, the deterioration in performance of the liquid crystal on exposure to the atmosphere remained a problem.

It was found, however, that rapid deterioration of performance does not seem to be a problem with encapsulated liquid crystals, in which the liquid crystal material is sealed in minute gelatin capsules come 10–30 microns in diameter. These minute gelatin capsules are then suspended in a water-latex vehicle to form a slurry which, when spread over a surface and allowed to dry, leaves a randomly packed film or coating of the tiny capsules of liquid crystal which adhere because of the latex. The heat-sensitive screen thus formed is ready for use as soon as drying in complete.

Figure 1:
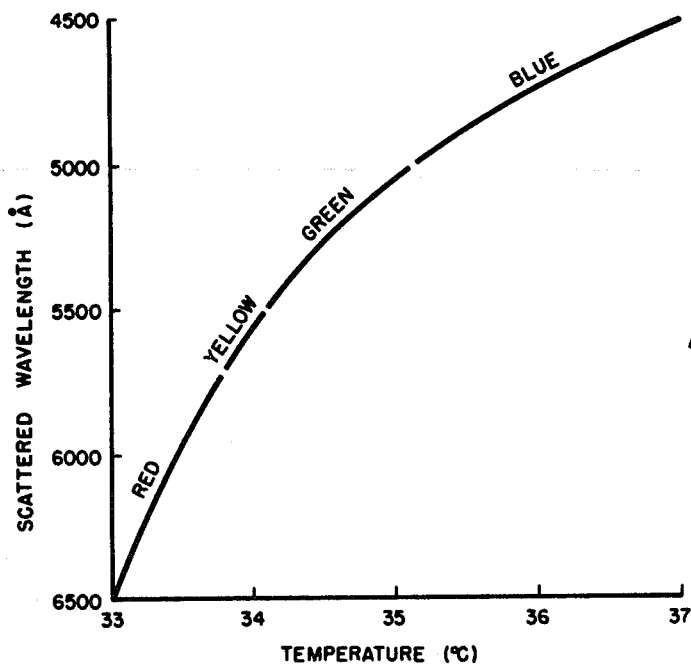
FIG. 1 is a graph showing the change of color with the change of temperature of the liquid crystal.

The temperature-color characteristic of the encapsulated liquid crystal used in the devices to be described is shown in FIG. 1. This particular material (Encapsulated Liquid Crystal Type R-33, manufactured by the National Cash Register Company, Dayton, Ohio) has a useful temperature range of 33–37° C, while other available types offer considerable choice of operating temperature and range. For example, materials can be obtained with a 1° C. operating range.

Figure 2:
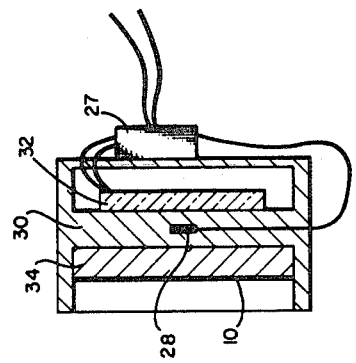
FIG. 2 is an elevation, partly in section, of one embodiment of the invention.

Early success was obtained with a 4-inch diameter "tuna-can" infrared-imaging detector shown in FIG. 2. This detector employs a 1-mil Mylar diaphragm sprayed on one side with ultraflat black Krylon lacquer as absorber, and coated on the outside surface with type R–33 encapsulated liquid crystal. The screen 10 thus prepared is stretched over the mouth of a can 12 and held taut using a plastic can cover 14 with t the center portion removed at 16.

Referring back to FIG. 1, the temperature-color characteristic of the encapsulated liquid crystal used is seen to have a maximum slope in the red-yellow-green region. It has been found that the best sensitivity can be achieved by thermally biasing the liquid crystal film to a temperature at which it first begins to change color, which will be referred to as the "critical temperature," so that a readily discernable color contrast can be obtained with relatively small changes of temperature (i.e., small changes of laser beam intensity). In this detector, the necessary thermal bias is provided by a heated baffle plate 18 air spaced an eighth of an inch behind screen 10 by means of spacer ring 20. Less than 2 watts of electrical power to a 40-ohm resistor 22 epoxied to plate 18 are required to maintain screen 10 at proper operating temperature (about 33.5° C. for the type encapsulated liquid crystal used). A regulated DC supply (not shown) may be used to stabilize heater input power, but an automatic temperature control is preferred.

This detector will give a good visual indication with a 10-micron flux of 10 milliwatts per square centimeter incident on the screen, and a narrow one milliwatt beam at 1,15 microns has been detected with this device. The screen is sensitive enough to respond to a flashlight, and to incandescent lamps placed closely its illumination for photographing the images. As used herein, sensitivity refers to the intensity of the incident flux needed to produce an image on the screen.

The detector is handicapped by a recovery time of several seconds, and suffers from image blooming because of thermal spreading in the Mylar diaphragm. However, both of the factors are improved with a gentle steady flow of air over the face of the screen. To avoid screen damage, incident flux should not exceed about 250 milliwatts per square centimeter, average. This power density is easily exceeded, however, even with a low-power laser if brought to a focus on the screen.

The detector just described is useful when milliwatts of power are involved, but there is greater need for a device with faster time constant which will image $CO_2$ laser beams of a watt and more. As used herein "time constant" is defined to mean the time that elapses between a change of the beam and a change of the image to correspond to the new beam form and intensity. Since adequate sensitivity is inherent in the liquid crystal mechanism, the problem is to provide good energy transfer from the laser beam to the liquid crystal while providing adequate heat sinking to dissipate the absorbed laser power.

Figure 3:
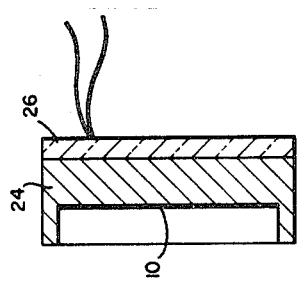
FIG. 3 is an elevation, partly in section, of another embodiment of the invention.

A 2-inch diameter detector of another tube is shown in FIG. 3. Although limited to a continuous average power input of about 1 watt in still air, this unit will tolerate 5w./cm.$^2$ for short periods. The detector employs a 1/2-inch thick black-anodized aluminum body 24 which functions as a heat distributor and a heat sink. A heater resistor 26 is intimately attached to the rear of the unit and provides the necessary thermal bias with about two watts of electrical input. This particular unit is not equipped with automatic temperature regulation and consequently heater input power needs to be adjusted to compensate for laser beam heating and changes in ambient temperature. An automatic temperature regulator may, however, be added to obviate the need to monitor the heat sink temperature and adjust the heater input power.

Figure 4:
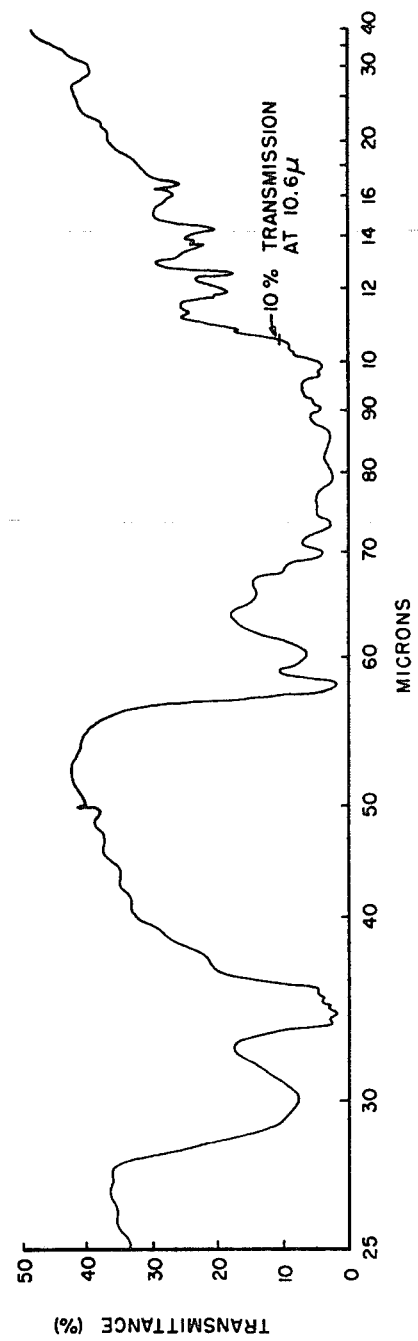
FIG. 4 is a graph showing the transmittance, or the inverse of the absorbency, of the encapsulated liquid crystal over a range of wavelengths from 2.5 to 40 microns.

In this type detector, screen 10 is formed by applying the encapsulated liquid crystal directly to the black anodized aluminum heat distributor 24 which also serves as the required black background. In this way, the time constant is minimized and resolution is maximized because the heat distributor, having high thermal conductivity, will conduct heat away from the zone of beam incidence. "Resolution," as used herein, refers to the precision of the correspondence between the size, shape and mode structure of the beam cross section and the image. The device relies on the infrared absorption of the encapsulated liquid crystal to convert laser beam energy to heat —directly in the encapsulated liquid crystal where it is most effective. The degree of infrared absorption can be inferred from the dual-beam spectrometer curve of FIG. 4 which shows the transmission through a comparable film of encapsulated liquid crystal. Assuming modest reflection, absorption is seen to be high at 10.6 microns and probably is adequate for laser beam imaging over the entire 2.5–40-micron range shown in the curve, although sensitivity will be down where absorption is low. The sensitivity of the Mylar diaphragm detector does not drop off in the same way because infrared absorption also takes place in the black backing. Qualitative measurements at 10.6 microns indicate reflection from the face of the detectors is low at that wavelength.

Figure 5:
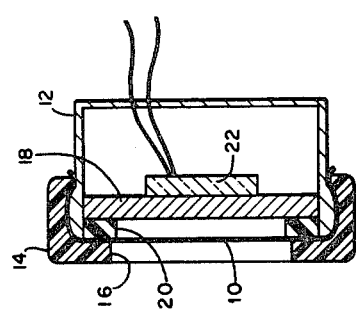
FIG. 5 is an elevation, partly in section, of a third embodiment of the invention.
Figure 6:
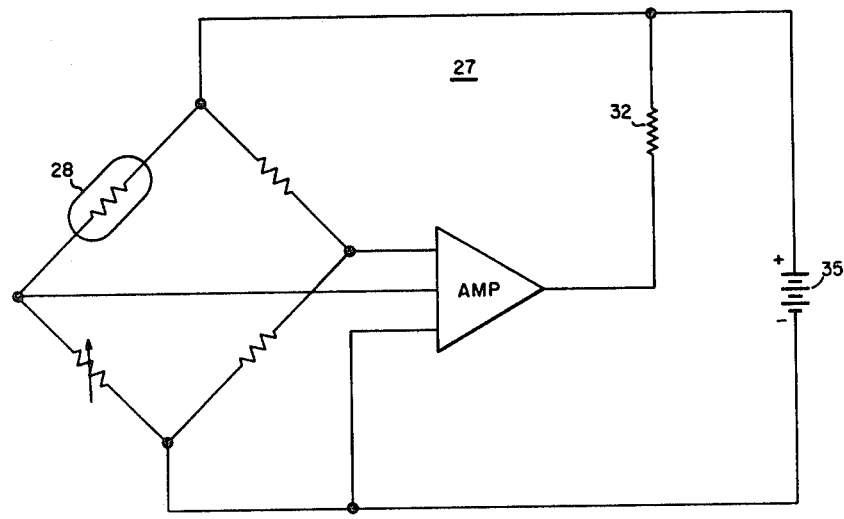
FIG. 6 is a circuit diagram for a heater control.

A third embodiment, shown in FIG. 5 employs a transistorized temperature control 27, one form of which is shown in FIG. 6, to maintain essentially constant bias temperature. A small bead thermistor 28 embedded in the ½-inch aluminum plate heat distributor 30 senses temperature for automatic control. Heat is applied by two high-wattage resistors 32 intimately attached to heat distributor 30. A thermal insulating layer 34 is interposed between the screen 10 and the heat distributor 30 to provide some design control over the time constant, sensitivity and image resolution of the device. Insulating layer 34 critically affects the image quality: the better it insulates, the more sensitive the detector but image resolution is then reduced because of thermal spreading, and the thermal time constant is increased because the encapsulated liquid crystal cannot cool as quickly through the insulation. Generally, a compromise is required among these factors in any design. For may applications, however, satisfactory results are obtained by using back anodized aluminum for the heat distributor 30. The anodizing also acting as a thin insulating layer. To some degree, the encapsulant also insulates the liquid crystal from the heat distributor 30.

Certain improvements are obtained using a thermally anisotropic material such as pyrolytic graphite for the layer 34. The material is made to have high thermal conductivity normal to the large area surface in contact with the heat distributor 30 and then encapsulated liquid crystal film to provide a low thermal resistance therebetween, while thermal resistance parallel to the large area surfaces is high, thereby minimizing thermal spreading and preserving maximum resolution of the image.

Power is provided by a 24-volt DC supply 35. Several similar detectors have been made using SCR control to permit operation directly from AC lines. In situations involving sensitive circuitry which might be affected by SCR-generated noise, the transistor control may be preferable.

These detectors work well with an incident power density at 10.6 microns of between 0.25 and 5w./cm². Much less than 250mu./cm². does not give satisfactory indication, and permanent scarring of the screen results at about 8w./cm². Beams of higher power density can be examined after expanding through a lens. At 1 micron, the sensitivity of this detector is down by a large factor, although a 1'-watt Nd:YAG laser beam has been detected. The principal advantage of this detector at 1 micron over the greater sensitivity of an infrared phosphor screen is the nonfading image.

Figure 7:
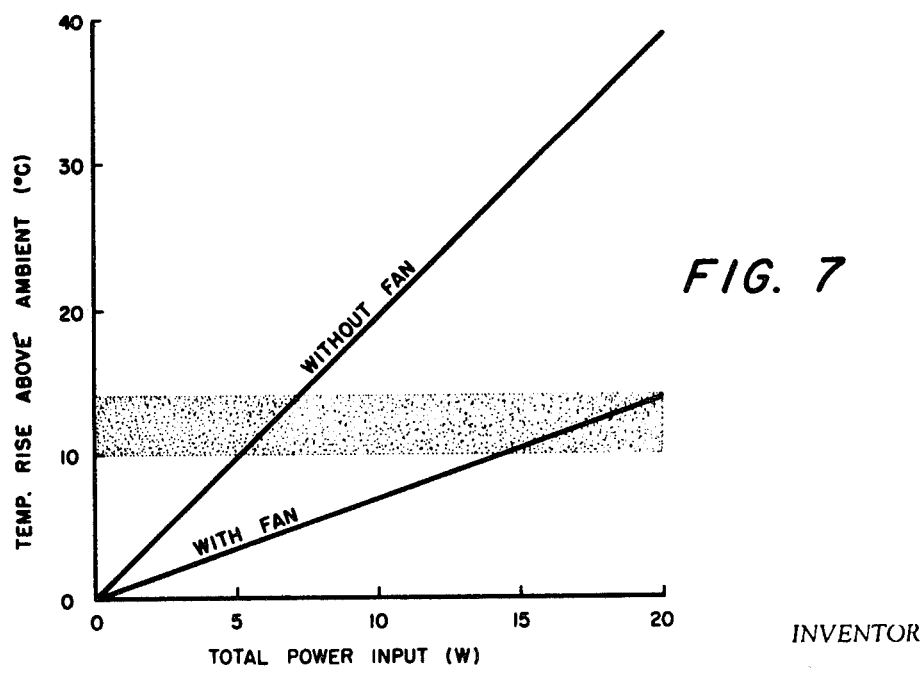
FIG. 7 is a graph showing the effect of the flow of air across the screen on the temperature increase over a range of power inputs.

A continuous beam power input of a watt or so can be accommodated with natural convention cooling, but higher beam input powers require augmented forced draft cooling so as to maintain proper thermal bias. FIG. 7 shows the detector temperature rise (above ambient) as a function of input power to the electrical heater for natural, unassisted convention cooling, and with supplementary fan cooling. The shaded area represents the operating temperature range of encapsulated liquid crystal type R-33 (with an assumed ambient temperature of 23° C.) It is seen that dissipation can be increased threefold with very modest forced air cooling. A small axial fan might be attached to the rear of the detector. For higher beam powers and air cooling, there would also be advantage in employing an encapsulated liquid crystal that functions at a higher bias temperature. Power handling capability could be further increased using controlled-temperature water cooling.

For many applications, a larger screen area is required because of uncertainty in beam location, or to accommodate higher beam powers and larger images. Fortunately, imaging detectors of this type can be made as large as required, and a number of 4-inch diameter detectors have been made.

Various methods were tried for applying the encapsulated coating, including spreading, brushing, and spraying, but usually with results which were less than satisfactory is one way or another. Attempts at spraying resulted in frequent clogging of the air brush used, but more important, the resulting screens did not provide good contrast and color brilliance. Brushing resulted in nonuniform and streaked screens. Best and most consistent results were obtained using a turntable technique in which the surface to be coated is rotated slowly during spreading and drying. The unit to be coated was centered on a variable-speed turntable, and speeds and amounts of encapsulated liquid crystal slurry were varies until good results were achieved. Thereafter, the proper amount of slurry was placed on the center of he detector face using a dropper, and with the table turning, the slurry could be spread in a matter of seconds using a toothpick gradually moved radially toward the circumference of the disc. The encapsulated liquid crystal slurry expands spirally to fill the area, and a fairly uniform coating can be achieved. Moderate nonuniformities in coating at this time often will not be apparent after the vehicle evaporates. Some smoothing occurs after application as the table continues to turn. It is essential that the turntable be level.

Two principal causes of screen blemish were encountered: "pimples" due to clumps of capsules, and void spots which appear to be caused by the oillike liquid crystal which had escaped its capsule, possible due to rupture while shaking up the slurry which tends to separate in the bottle. Filtering the slurry through nylon stocking material eliminates most of the pimple problems.

For the 2-inch screens, 10 drops of encapsulated liquid crystal hurry were applied to the center of the screen and were spread while it was turning at about 30 r.p.m. For the 4-inch screens, 40 drops of slurry were applied and spread while the unit was turning at about 8 r.p.m. Rotation should continue until the coating has dried.

Film type screens have been made using ¼, ½, and 1-mil Mylar sheet. The ½-mil sheet is a good compromise between sensitivity and strength. The cleaned film was stretched over an embroidery hoop and sprayed on the inside with flat black lacquer. After drying, the hoop is fitted over the turntable which holds a dummy 4-inch plate to provide a flat surface against the underside of the Mylar film. The face of the screen is then coated with the encapsulated liquid crystal in the same manner as the aluminum plates. Some difficulty was experienced in wetting the Mylar film, but this was helped by washing the film with detergent and adding a small amount to the slurry. While still stretched on the hoop, the coated screen can be clamped between halves of a mounting ring, or it can be removed from the hoop and mounted on the detector as in FIG. 2. The excess Mylar film is trimmed with a razor blade after mounting.

Obviously, numerous variations and modifications of the present invention are possible in the light of the above teachings. It is therefore to be understood that within the scope of the appended claims the invention may be practiced otherwise as specifically described.

What is claimed and desired to secured by Letters Patent of the United States is:

1. Apparatus for displaying a visual pattern of incident infrared radiation, comprising;
   a film of an encapsulated liquid crystal composition
   a heat distributor having a surface in heat transfer relationship with said film,
   a heater,
   said heater connected with said heat distributor means for applying heat thereto which is uniformly distributed across the heat distributor means for biasing said film to the critical temperature thereof, and
   a thermal-insulating means interposed between said film and said heat distributor whereby the rate of heat transfer between said heat distributor and said film may be controlled.

2. Apparatus defined in claim 1, wherein:
   said insulating means comprises a layer of a thermally anisotropic material whereby heat generated by said incident infrared radiation may be conducted perpendicularly away from said film at a faster rate than heat is conducted laterally across said film to control image blooming.

3. Apparatus defined in claim 1, further comprising:
   spacer means interposed between said surface and said film for maintaining a spaced adjacent relationship therebetween;
   said film and said surface defining therebetween a volume containing a gas of low thermal conductivity, said gas filled volume comprising said thermal insulating means.